US012165547B2

(12) United States Patent
Zeng

(10) Patent No.: US 12,165,547 B2
(45) Date of Patent: Dec. 10, 2024

(54) ROLLABLE DISPLAY DEVICE

(71) Applicant: Wuhan China Star Optoelectronics Semiconductor Display Technology Co., Ltd., Wuhan (CN)

(72) Inventor: Jie Zeng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/312,182

(22) PCT Filed: Apr. 22, 2021

(86) PCT No.: PCT/CN2021/088857
§ 371 (c)(1),
(2) Date: Sep. 9, 2022

(87) PCT Pub. No.: WO2022/183579
PCT Pub. Date: Sep. 9, 2022

(65) Prior Publication Data

US 2023/0401984 A1 Dec. 14, 2023

(30) Foreign Application Priority Data

Mar. 4, 2021 (CN) ........................ 202110239728.X

(51) Int. Cl.
*G09F 9/30* (2006.01)
*G09F 9/33* (2006.01)

(52) U.S. Cl.
CPC .............. *G09F 9/301* (2013.01); *G09F 9/335* (2021.05)

(58) Field of Classification Search
None
See application file for complete search history.

(56) References Cited

U.S. PATENT DOCUMENTS

| | | | | |
|---|---|---|---|---|
| 8,151,501 | B2 * | 4/2012 | Bemelmans | G06F 1/1615 40/610 |
| 8,385,055 | B2 * | 2/2013 | Kao | G06F 1/1616 361/679.04 |
| 9,098,241 | B1 | 8/2015 | Cho et al. | |
| 9,286,812 | B2 * | 3/2016 | Bohn | H10K 50/84 |

(Continued)

FOREIGN PATENT DOCUMENTS

| | | |
|---|---|---|
| CN | 105590554 A | 5/2016 |
| CN | 106847103 A | 6/2017 |

(Continued)

*Primary Examiner* — Xanthia C Relford
(74) *Attorney, Agent, or Firm* — Nathan & Associates; Menachem Nathan

(57) ABSTRACT

A rollable display device, including a housing and a display panel, is provided. The housing includes an accommodating housing, and the accommodating housing includes an internal accommodating space. The display panel at least includes a first display region and a second display region and can be switched between a rolled-up state and an unrolled state. When in the rolled-up state, the first display region is rolled up in an accommodating space, and the second display region is located outside the accommodating housing and is configured to display. When in the unrolled state, the first display region is rolled out of the accommodating housing.

16 Claims, 8 Drawing Sheets

(56) References Cited

U.S. PATENT DOCUMENTS

| | | | | |
|---|---|---|---|---|
| 9,519,313 | B2 * | 12/2016 | Kim | G06F 1/166 |
| 10,082,826 | B1 * | 9/2018 | Salmon | G06F 1/1615 |
| 10,878,728 | B2 * | 12/2020 | Yoon | G06F 1/1624 |
| 11,170,671 | B1 * | 11/2021 | Han | G09F 9/301 |
| 2008/0049003 | A1 * | 2/2008 | Hasegawa | G06F 1/1652 345/206 |
| 2013/0058063 | A1 * | 3/2013 | O'Brien | G06F 1/1624 361/807 |
| 2016/0100478 | A1 * | 4/2016 | Lee | G06F 1/1624 361/749 |
| 2016/0165717 | A1 | 6/2016 | Lee et al. | |
| 2016/0231843 | A1 * | 8/2016 | Kim | G06F 3/0412 |
| 2017/0325342 | A1 * | 11/2017 | Lee | H10K 50/84 |
| 2018/0014417 | A1 * | 1/2018 | Seo | H05K 1/189 |
| 2021/0204426 | A1 * | 7/2021 | Rha | H05K 5/0017 |

FOREIGN PATENT DOCUMENTS

| | | | |
|---|---|---|---|
| CN | 107221254 | A | 9/2017 |
| CN | 108924291 | A | 11/2018 |
| CN | 110322792 | A | 10/2019 |
| CN | 110718154 | A | 1/2020 |
| CN | 111179760 | A | 5/2020 |
| CN | 111261049 | A | 6/2020 |
| CN | 111383540 | A | 7/2020 |
| CN | 111462621 | A | 7/2020 |
| CN | 111508366 | A | 8/2020 |
| CN | 112863363 | A | 5/2021 |
| KR | 20080058683 | A | 6/2008 |
| KR | 20200108135 | A | 9/2020 |
| KR | 20200133136 | A | 11/2020 |
| WO | 2018227753 | A1 | 12/2018 |

* cited by examiner

ROLLABLE DISPLAY DEVICE

BACKGROUND OF INVENTION

Field of Invention

The present disclosure relates to the field of display technology and specifically to a rollable display device.

Description of Prior Art

With development of organic light emitting diode (OLED) display technology, flexible OLED technology has gradually matured, and at the same time, various emerging display modes have come into being. Wherein, as a new display technology module, rollable OLED display modules have become one of core directions of innovation and development of global panel and module manufacturers.

Generally, the rollable OLED display modules include accommodating housings and flexible OLED display panels. When the rollable OLED display modules are in a rolled-up state, the flexible OLED display modules are rolled up and accommodated in accommodating housings. At this time, information such as time and notifications, etc. cannot be viewed conveniently, and functions such as photo previews cannot be realized, resulting in poor user experience.

SUMMARY OF INVENTION

The present disclosure provides a rollable display device, which can solve the problem that basic display functions cannot be realized in a folded state.

In order to solve the aforesaid problems, on a first aspect, the present disclosure provides a display device. The rollable display device includes a housing and a display panel.

The housing includes an accommodating housing, and the accommodating housing includes an internal accommodating space and an opening communicated with the accommodating space;

- the display panel at least includes a first display region and a second display region and can be switched between a rolled-up state and an unrolled state;
- when the display panel is in the rolled-up state, the first display region is rolled up in the accommodating space through the opening, and the second display region is located outside the accommodating housing and is configured for display; and
- when the display panel is in the unrolled state, the first display region is rolled out of the accommodating housing through the opening.

In the display device provided by one embodiment of the present disclosure, when the display panel is in the rolled-up state, the second display region is at least partially abutted an outer surface of the housing; when the display region is in the unrolled state, the second display region is away from the outer surface of the housing and is configured to display together with the first display region.

In the display device provided by one embodiment of the present disclosure, a magnetic attraction device is disposed on the outer surface of the housing, and the second display region is detachably abutted the outer surface of the housing by the magnetic attraction device.

In the display device provided by one embodiment of the present disclosure, the second display region includes a transition display region and an attaching display region, the transition display region is connected between the first display region and the attaching display region; when the display panel is in the rolled-up state, the transition display region is bent to form a curved surface to make the attaching display region abut the outer surface of the housing.

In the display device provided by one embodiment of the present disclosure, the rollable display device further includes a hinge, and the hinge is disposed on a lateral surface of the transition display region facing away from a light-exiting direction.

In the display device provided by one embodiment of the present disclosure, the housing further includes a supporting housing, the supporting housing is connected to a side of the accommodating housing where the opening is defined, a supporting surface is formed on a side of supporting housing away from the accommodating housing, and the attaching display region is abutted the supporting surface.

In the display device provided by one embodiment of the present disclosure, the rollable display device further includes a transparent cover plate, and the transparent cover plate is attached to at least part of the second display region.

In the display device provided by one embodiment of the present disclosure, the transparent cover plate is a planar cover plate attached to the attaching display region.

In the display device provided by one embodiment of the present disclosure, the housing further includes a protective housing, the protective housing is connected to the accommodating housing on a side of the opening, the opening is located between the protective housing and the supporting housing, the planar cover plate is in contact with the protective housing and the supporting housing to make the transition display region is be disposed in a space formed by the accommodating housing, the protective housing, and the planar cover plate when the display panel is in the rolled-up state.

In the display device provided by one embodiment of the present disclosure, the unrolled state comprises a first unrolled state and a second unrolled state, when the display panel is in the first unrolled state, the first display region is rolled out from the accommodating housing along a horizontal direction and flattened; when the second display panel is in the second unrolled state, the transition display region is flattened from a curved-surface state to make the first display region, the transition display region, and the attaching display region be coplanar.

In the display device provided by one embodiment of the present disclosure, the transparent cover plate includes a bending region and a planar region, the bending region is attached to the transition display region, and the planar region is attached to the attaching display region.

In the display device provided by one embodiment of the present disclosure, when the display panel is in the rolled-up state, the bending region of the transparent cover plate is abutted the accommodating housing at an upper edge of the opening.

In the display device provided by one embodiment of the present disclosure, the accommodating housing is cylindrical, and the second display region is abutted an outer lateral surface of the accommodating housing.

In the display device provided by one embodiment of the present disclosure, the display panel is an organic light emitting diode (OLED) display panel.

In the display device provided by one embodiment of the present disclosure, the opening is a slit-typed opening.

In the display device provided by one embodiment of the present disclosure, a roller shaft is further disposed in the accommodating housing, the first display region is rolled up or unrolled by the roller shaft.

In the display device provided by one embodiment of the present disclosure, a shape of the display device is a strip-shaped rectangle.

In the display device provided by one embodiment of the present disclosure, anti-curl strips are disposed on two lateral sides of the display panel along a rolled-up direction.

The present disclosure provides a rollable display device, including the housing and the display panel. The display panel at least includes the first display region and the second display region and is switched between the rolled-up state and the unrolled state. When the display panel is in the rolled-up state, the first display region is rolled up in the internals of the accommodating housing, while the second display region is not rolled up and is still disposed out of the accommodating housing for display, that is, the second display region is added. In the rolled-up state, basic display requirements, for example, viewing information such as time and notifications, and taking photos and previewing is satisfied by the second display region, thereby preventing frequent unrolling actions during using processes. Therefore, user experience can be improved, and service life of the rollable display device can be prolonged.

DETAILED DESCRIPTION OF EMBODIMENTS

The technical solutions in the embodiments of the present disclosure are clearly and completely described in the following with reference to the accompanying drawings in the embodiments of the present disclosure. Obviously, the described embodiments are only part of the embodiments of the present disclosure, and are not all embodiments of the present disclosure. All other embodiments obtained by those skilled in the art based on the embodiments of the present disclosure without creative efforts are within the scope of the present disclosure.

In the description of the present disclosure, it is to be understood that the orientation or positional relationship indicated by the terms "center", "longitudinal", "transverse", "length", "width", "thickness", "upper", "lower", "front", "rear", "left", "right", "vertical", "horizontal", "top", "bottom", "inside", "outside", etc. is based on the orientation or positional relationship shown in the accompanying figures, which is merely for the convenience for describing of the present disclosure and for the simplification of the description, and is not intended to indicate or imply that the indicated devices or elements have a specific orientation or is constructed and operated in a specific orientation. Therefore, it should not be understood as a limitation on the present disclosure. Moreover, the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly. In the description of the present disclosure, the meaning of "a plurality" is two or more unless clearly and specifically defined otherwise.

In the present disclosure, the term "exemplary" is used to mean "serving as an example, instance, or illustration." Any embodiment described in this application as "exemplary" is not necessarily to be interpreted as preferred or advantageous over other embodiments. The following description is presented for enable any person skilled in the art to make and use the present disclosure. In the following description, details are listed for the purpose of explanation. It should be understood that one skilled in the art will recognize that the present disclosure can be practiced without the specific details. In other embodiments, well-known structures and procedures are not described in detail to avoid unnecessary details making the description of the present disclosure to become opacity. Therefore, the present disclosure is not intended to be limited to the embodiments shown, but is in accordance with the broad scope of the principles and characteristics disclosed by present disclosure.

Figure 1:
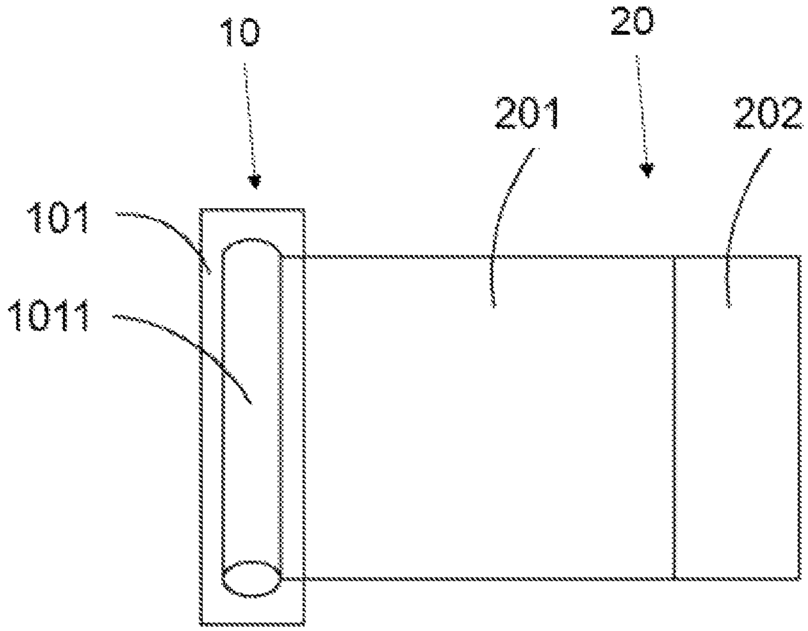
FIG. 1 is a top-viewed structural schematic diagram of a rollable display device provided by one embodiment of the present disclosure in an unrolled state.
Figure 2:
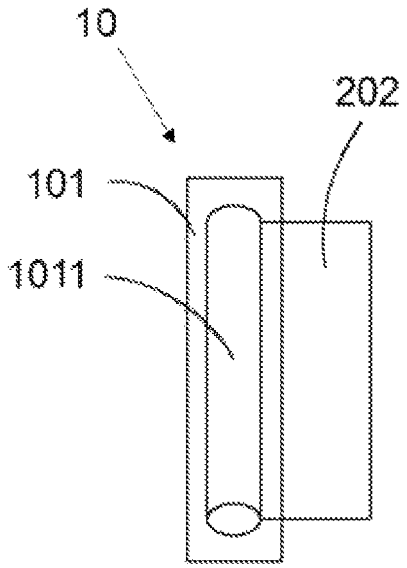
FIG. 2 is a top-viewed structural schematic diagram of the rollable display device provided by one embodiment of the present disclosure in a rolled-up state.

One embodiment of the present disclosure provides a rollable display device, a top-viewed structural schematic diagram of the rollable display module in an unrolled stated provided by FIG. 1 and a top-viewed structural schematic diagram of the rollable display module in a rolled-up state provided by FIG. 2 are combined as the following to describe in detail.

Specifically, the rollable display device includes a housing 10 and a display device 20.

The housing 10 includes an accommodating housing 101. The accommodating housing 101 is a hollow structure and includes an internal accommodating space and an opening communicated with the accommodating space. Wherein, the accommodating space is configured to accommodate and store the rolled-up display panel, the opening communicated with the accommodating space serves as a channel for realizing the rolling up and unrolling of the display panel 20, and it is usually a slit-typed opening slightly wider than the display panel 20.

The display panel 20 at least includes a first display region 201 and a second display region 202. According to practical requirements of display, the display panel 20 can be switched between a rolled-up state and an unrolled state.

When the display panel 20 is in the rolled-up state, the first display region 201 is rolled up in the accommodating space through the opening. The second display region 202 is located outside the accommodating housing 101 and is configured to display, i.e., which forms the structure illustrated in FIG. 2. In general situations, rolling up and unrolling of the first display region are realized by a roller shaft 1011 disposed in the accommodating space in the internal of the accommodating housing 101. Of course, the first display region can also be rolled-up or unrolled by other methods, and it is not limited by the present disclosure.

When the display panel 20 is in the unrolled state, the first display region 201 is rolled out of the accommodating housing 101 through the opening, i.e., which forms the structure as illustrated in FIG. 1. At this time, the first display region 201 and the second display region 202 are configured to display together. In general situations, a shape of the display device 20 is a strip-shaped rectangle. A display area of the first display region 201 is relatively large and acts as a main display area, and a display area of the second display region 202 is relatively small and acts as an assistant display region.

In the rollable display device provided by this embodiment, the second display region is added. In the rolled-up state, the second display region is still located outside the accommodating housing to satisfy basic display requirements, for example, viewing information such as time and notifications, and taking photos and previewing, thereby preventing frequent unrolling actions during using processes. Therefore, user experience can be improved, and service life of the rollable display device can be prolonged.

In several embodiments, anti-curl strips (not shown in the figure) are disposed on two lateral sides of the display panel along a rolled-up direction, i.e., upper and lower lateral sides illustrated in FIG. 1. Therefore, the risk of warpage on an edge of the display panel 20 after repeatedly rolling up and unrolling is reduced to prolong the service life of the rollable display device.

Figure 3:
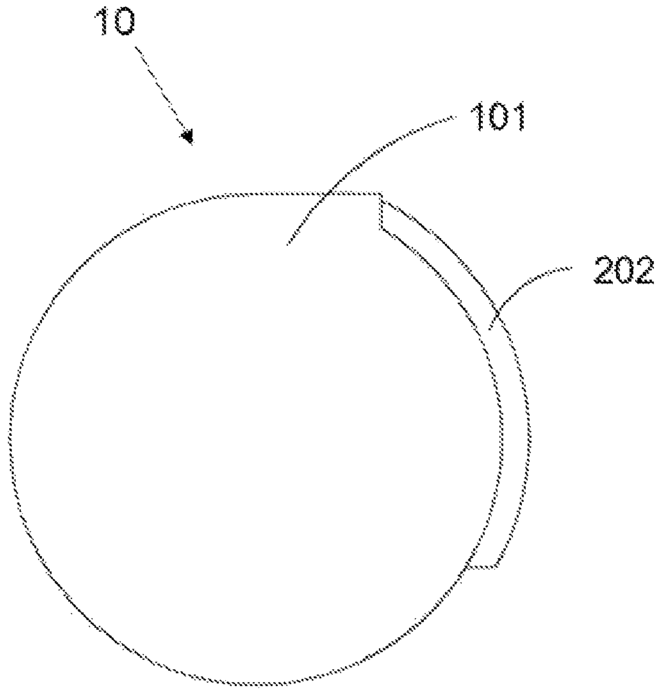
FIG. 3 is a side-viewed structural schematic diagram of the rollable display device provided by one embodiment of the present disclosure in the rolled-up state.

In several embodiments, please refer to a side-viewed structural schematic diagram of the rollable display device in the rolled-up state provided by FIG. 3. When the display panel is in the rolled-up state, the first display region is rolled up in the accommodating space of the accommodating housing 101, and the second display region 202 is at least abutted the outer surface of the housing 10. For example, as illustrated in FIG. 3, all regions of the second display regions 202 are abutted the outer surface of the housing 10. Of course, in the second display region 202, there can also be part of the regions abutted the outer surface of the housing 10. For details, please refer to the following embodiments. By this design, on one hand, a volume of the rollable display device in the rolled-up state is reduced, and portability is improved; on the other hand, using the outer surface of the housing 10 as a supporting backplate for the second display region 202 improves shockproof ability and anti-dropping ability thereof.

It can be understood that the term "abut" herein refers to the second display region 202 and the outer surface of the housing 10 are in a detachably connected state. In the rolled-up state, the second display region 202 is connected to the outer surface of the housing 10, while in a non-rolled-up state, the second display region 202 and the outer surface of the housing 10 can be separated under a situation of not damaging contact surfaces. Specifically, a magnetic attraction device 203 can be disposed between the second display region 202 and the outer surface corresponding to the housing 10 to realize the aforesaid detachable connection.

In several embodiments, because the first display region of the display panel is usually strip-shaped, the accommodating housing configured to provide the accommodating space should also be a strip-shaped design. In general situations, the accommodating housing is strip-shaped cylindrical or rectangular parallelepipedal. For example, when the accommodating housing is strip-shaped cylindrical, referring to the side-viewed structural schematic diagram thereof in FIG. 3, at this time, the outer surface of the accommodating housing 101 is a smooth curved surface, one end of the second display region 202 extends from the opening of the accommodating housing 101, and along the extending direction, whole second display region 202 is abutted the outer surface of the housing 10 and is in a curved surface state.

Figure 4:
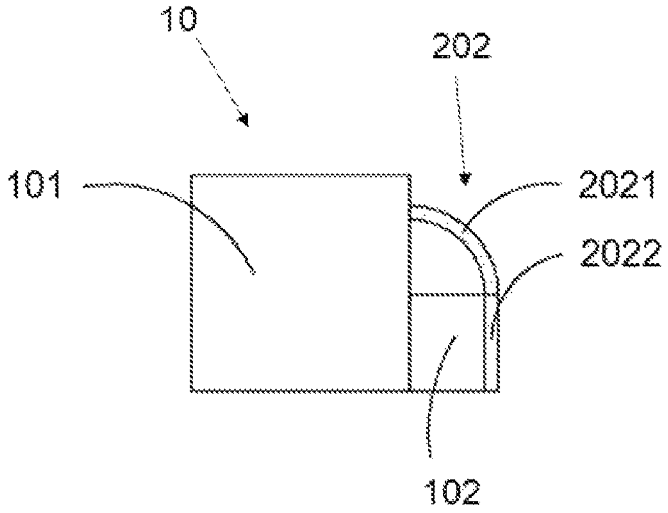
FIG. 4 is a side-viewed structural schematic diagram of another rollable display device provided by one embodiment of the present disclosure in the rolled-up state.

In several embodiments, please refer to a side-viewed structural schematic diagram of the rollable display device in the rolled-up state provided by FIG. 4. The accommodating housing 101 is strip-shaped rectangular parallelepipedal. At this time, if the second display region 202 has extended from the opening of the accommodating housing 101 and directly covers the outer lateral surface of the accommodating housing 101, a corner with approximately right angle can be formed at a junction of the first display region and the second display region 202. As a result, greater stress will be generated here, which easily causes cracks and leads to poor display.

In order to prevent the aforesaid problems, the second display region 202 includes a transition display region 2021 and an attaching display region 2022. The transition display region 2021 is connected between the first display region and the attaching display region 2022. The transition display region is bent to form a curved surface, which allows the attaching display region 2022 to be abutted the outer surface of the housing 10. That is, by the part of the second display region 202 extending from the opening of the accommodating housing 101, i.e., the transition display region 2021, is bent to form the curved surface, and then the corner with approximately right angle is transited to form a smooth curved angle. Therefore, the aforesaid problem of cracks in the display panel due to excessive stress is prevented.

Here, bending the transition display region to form the curved surface can be realized by various structural designs to allow the attaching display region to be abutted the outer surface of the housing, and for details please refer to the following embodiments.

In one embodiment, the aforesaid solution is realized by disposing a supporting housing. Please continue to refer to a side-viewed structural schematic diagram of the rollable display device in the rolled-up state provided by FIG. 4. Specifically, the housing 10 further includes the supporting housing 102. The supporting housing 102 is connected to a side of the accommodating housing 101 where the opening is defined, and a supporting surface is formed on a side of supporting housing away from the accommodating housing 101. Therefore, the transition display region 2021 is allowed to extend from the opening of the accommodating housing 101 and to be bent toward a direction of the supporting housing 102 to form the curved surface, so an end of the attaching display region 2022 is abutted the supporting surface of the supporting housing 102. That is, by disposing one supporting housing 102 on the outer lateral surface of the accommodating housing 101, a position where the attaching display region 2022 is abutted is transferred from the outer lateral surface of the accommodating housing 101 to the outer lateral surface of the supporting housing 102, while a bonding space is also provided to the transition display region 2021 to form a smooth curved surface at the same time.

Figure 5:
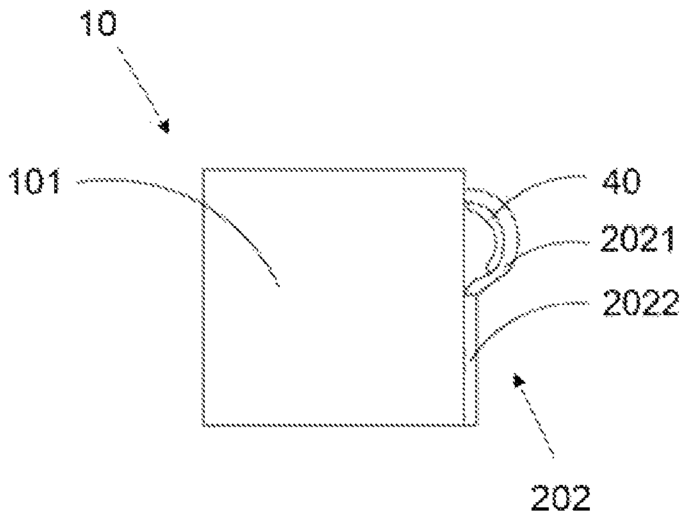
FIG. 5 is a side-viewed structural schematic diagram of still another rollable display device provided by one embodiment of the present disclosure in the rolled-up state.

In one embodiment, the aforesaid solution can also be realized by disposing a hinge. Please refer to a side-viewed structural schematic diagram of the rollable display device in the rolled-up state provided by FIG. 5. Specifically, the rollable display device further includes a hinge 40. The hinge 40 is disposed on a lateral surface of the transition display region 2021 facing away from a light-exiting direction. By the assistance of the hinge 40, the transition display region 2021 is bent at a larger angle, so that the attaching display region 2022 is directly abutted the outer lateral surface of the accommodating housing 101 along the bending direction. Compared to the previous embodiment, the structure of this embodiment is simpler, but there are several disadvantages at the same time, i.e., currently, the hinge technology used for bending display is not yet mature, and the cost is relatively high. Therefore, in practical applications, selections can be executed according to actual requirements.

Figure 6:
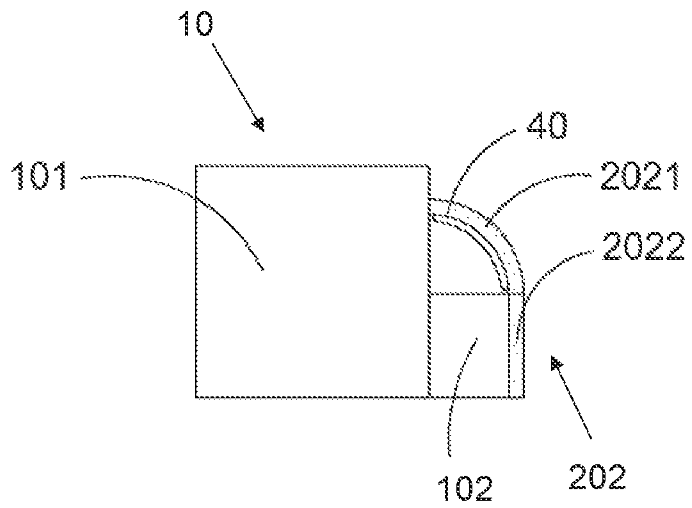
FIG. 6 is a side-viewed structural schematic diagram of still another rollable display device provided by one embodiment of the present disclosure in the rolled-up state.

In one embodiment, the hinge structure and the supporting housing of the aforesaid embodiments can be disposed together. Specifically, please refer to a side-viewed structural schematic diagram of the rollable display device in the rolled-up state provided by FIG. 6. The housing 10 further includes the supporting housing 102. The supporting housing 102 is connected to a side of the accommodating housing 101 where the opening is defined, and a supporting surface is formed on a side of supporting housing 102 away from the accommodating housing 101. Therefore, the transition display region 2021 is allowed to extend from the opening of the accommodating housing 101 and to be bent toward a direction of the supporting housing 102 to form the curved surface, so an end of the attaching display region 2022 is abutted the supporting surface of the supporting housing 102. At the same time, the hinge 40 is further disposed on a lateral surface of the transition display region 2021 away from the light-exiting direction to assist the bent curved surface formed by the transition display region 2021, so that the risk of cracks appearing at this region is further reduced.

Of course, except the two specific solutions given in the aforesaid embodiments, other arbitrary structure configurations can also be used to realize the solution that the transition display region is bent to form the curved surface to allow the attaching display region to be abutted the outer surface of the housing, which is not limited by the present disclosure.

Furthermore, in several embodiments, because the display region is always disposed outside the accommodating housing no matter the display panel is in the rolled-up state or in the unrolled state, it is likely to be damaged during a collision process or a falling process, resulting in poor display. The rollable display device further includes a transparent cover plate. The transparent cover plate is attached on at least part of a region of the second display region. The transparent cover plate is usually formed of a hard material and is attached to a lateral surface of the second display region in the light-exiting direction, thereby serving protective effect for the second display region.

Wherein, for details of a specific structure of the transparent cover plate please refer to the following embodiment.

Figure 7:
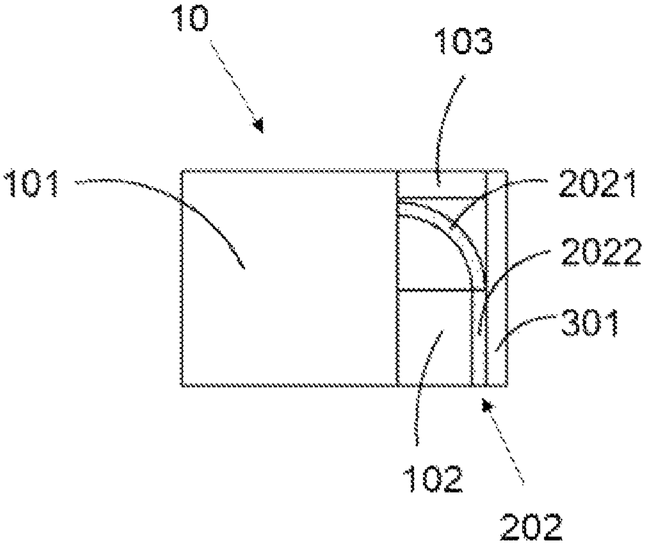
FIG. 7 is a side-viewed structural schematic diagram of yet another rollable display device provided by one embodiment of the present disclosure in the rolled-up state.
Figure 8:
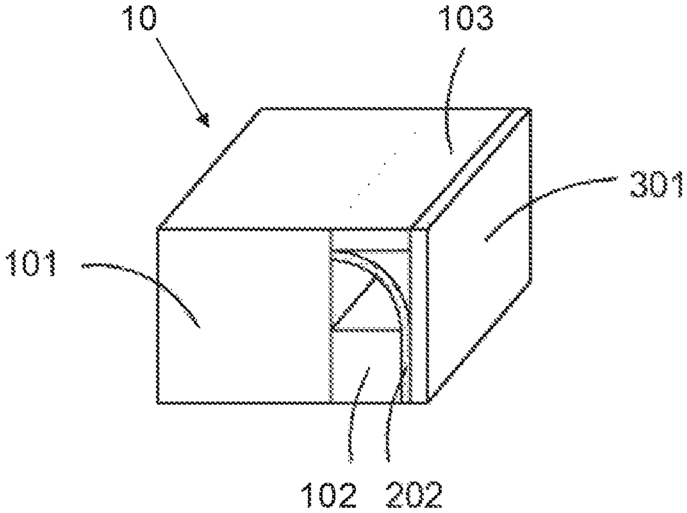
FIG. 8 is a three-dimensional structural schematic diagram of yet another rollable display device provided by one embodiment of the present disclosure in the rolled-up state.

In one embodiment, please refer to a side-viewed structural schematic diagram of the rollable display device in the rolled-up state provided by FIG. 7 and a three-dimensional structural schematic diagram of the rollable display module in the rolled-up state provided by FIG. 8. The transparent cover plate is a planar cover plate 301. The planar cover plate 301 is attached to a lateral surface of the light-exiting direction of the attaching display region 2022 to protect the attaching display region 2022.

Furthermore, because the transition display region 2021 is in a curved-surface state, the planar cover plate 301 cannot be attached to the transition display region 2021, thereby protecting the transition display region 2021. Other structures need to be disposed to protect the transition display region 2021. Specifically, please continue to refer to FIG. 7. The housing further includes a protective housing 103. The protective housing 103 is connected to the accommodating housing 101 on a side of the opening to allow the opening to be located between the protective housing 103 and the supporting housing 102. At this time, the protective housing 103, a right lateral wall of the accommodating housing 101, and an upper lateral wall of the supporting housing 102 form one groove, and the transition display region 2021 is allowed to be accommodated in the groove. Meanwhile, a height of the planar cover plate 301 is greater than a height of the attaching display region 2022. Therefore, when the display panel is in the rolled-up state, the planar cover plate 301 is allowed to be abutted the protective housing 103 and the supporting surface of the supporting housing 102. Therefore, the transition display region 2021 is allowed to be placed in the space formed by the accommodating housing 101, the protective housing 103, and the planar cover plate 301. In this way, protection for the transition display region 2021 is realized.

Figure 9:
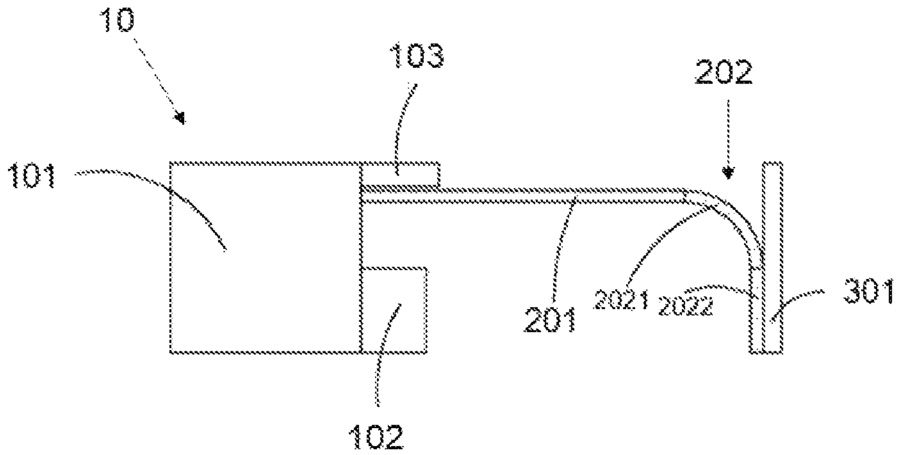
FIG. 9 is a side-viewed structural schematic diagram of yet another rollable display device provided by one embodiment of the present disclosure in a first unrolled state.
Figure 10:
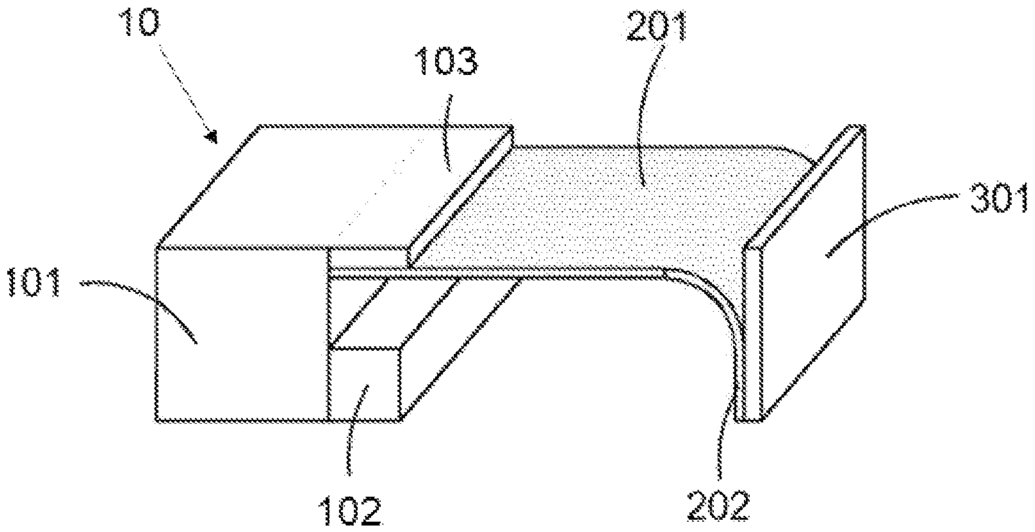
FIG. 10 is a three-dimensional structural schematic diagram of yet another rollable display device provided by one embodiment of the present disclosure in the first unrolled state.
Figure 11:
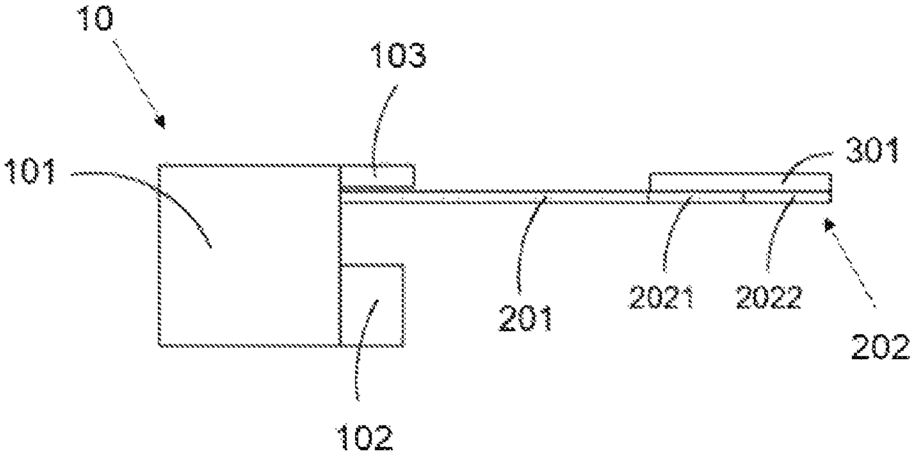
FIG. 11 is a side-viewed structural schematic diagram of yet another rollable display device provided by one embodiment of the present disclosure in a second unrolled state.
Figure 12:
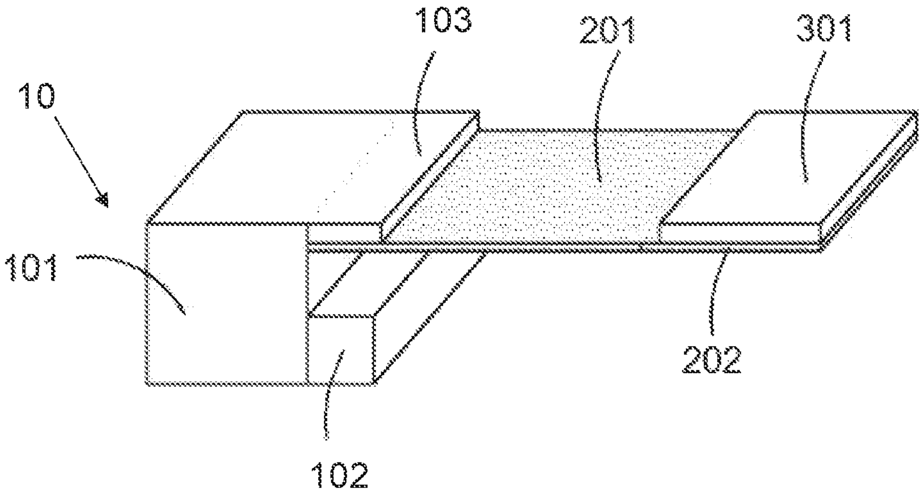
FIG. 12 is a three-dimensional structural schematic diagram of yet another rollable display device provided by one embodiment of the present disclosure in the second unrolled state.

In the display device provided by this embodiment of the present disclosure, the display panel has a first unrolled state and a second unrolled state. When the display panel is in the first unrolled state, the first display region 201 is rolled out from the accommodating housing 101 along a horizontal direction and flattened, i.e., the side-viewed structure illustrated in FIG. 9 and a three-dimensional structure illustrated in FIG. 10 are formed. Furthermore, the planar cover plate 301 is rotated in a counterclockwise direction and is rotated from a vertical direction to a horizontal direction, while the transition display region 2021 is flattened from the curved-surface state, and the attaching display region 2022 is also rotated from the vertical direction to the horizontal direction at the same time. Therefore, the first display region 201, the transition display region 2021, and the attaching display region 2022 are allowed to be coplanar to realize a maximum display area, i.e., the side-viewed structure illustrated in FIG. 11 and the three-dimensional structure illustrated in FIG. 12 are formed. At this time, the display panel is in the second unrolled state.

Figure 13:
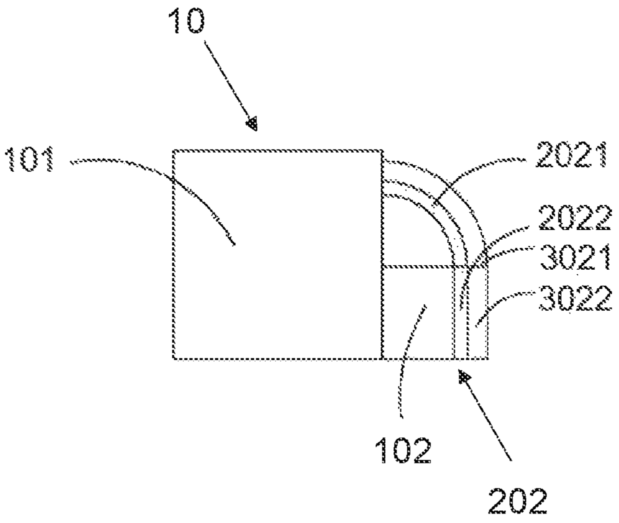
FIG. 13 is a side-viewed structural schematic diagram of still another rollable display device provided by one embodiment of the present disclosure in the rolled-up state.)
Figure 14:
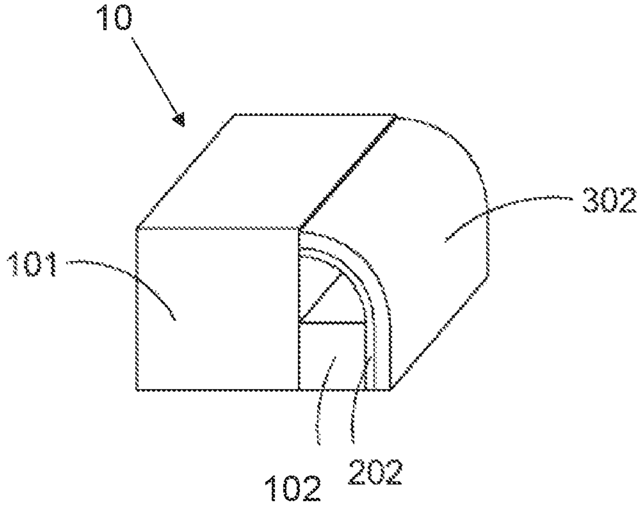
FIG. 14 is a three-dimensional structural schematic diagram of still another rollable display device provided by one embodiment of the present disclosure in the rolled-up state.
Figure 15:
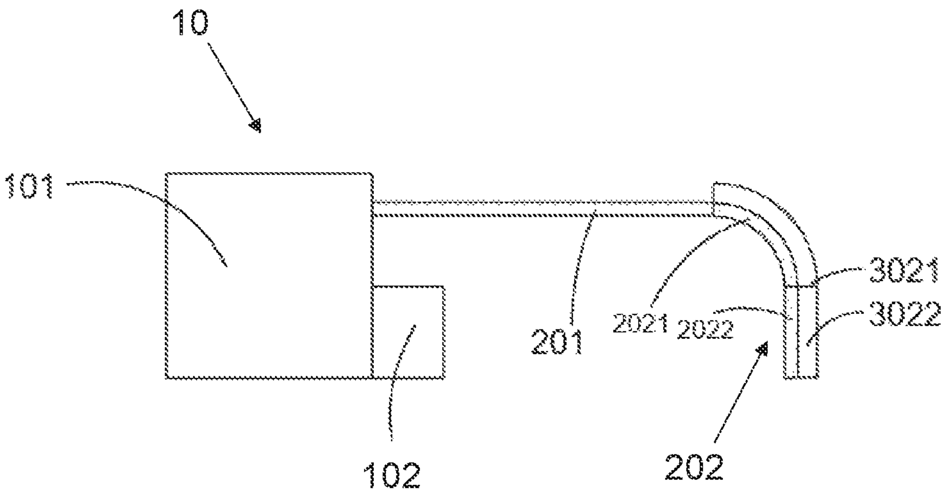
FIG. 15 is a side-viewed structural schematic diagram of still another rollable display device provided by one embodiment of the present disclosure in the unrolled state.
Figure 16:
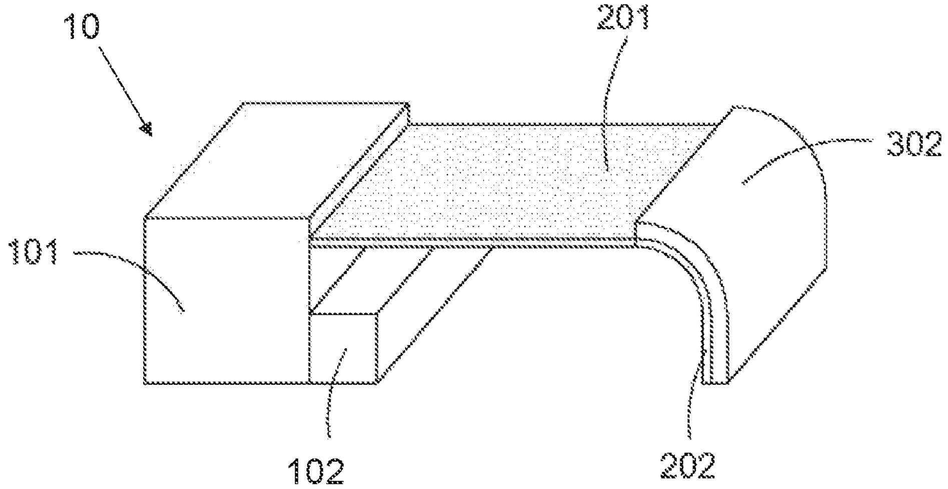
FIG. 16 is a three-dimensional structural schematic diagram of still another rollable display device provided by one embodiment of the present disclosure in the unrolled state.

In another embodiment, a rollable display device is further provided. A structure thereof is approximately same as the structure of the rollable display device provided in the previous embodiment, and the only difference is that the structures of the transparent cover plates are different. Specifically, please refer to a side-viewed structural schematic diagram of the rollable display device in the rolled-up state provided in FIG. 13 and a three-dimensional structural schematic diagram of the rollable display module in the rolled-up state provided by FIG. 14. The transparent cover plate 302 is a protective cover plate and includes a bending region 3021 and a planar region 3022. The bending region 3021 is attached to a lateral surface of the transition display region 2021 along a light-exiting direction. The planar region 3022 is attached to a lateral surface of the attaching display region 2022 along a light-exiting direction. Therefore, by the protective cover plate, protective effects on the transition display region 2021 and the attaching display region 2022 are realized. Compared to the structure of the rollable display device provided by the previous embodiment, the protective effects for the transition display region 2021 and the attaching display region 2022 can be realized at the same time only by the protective cover plate, and there is no need to dispose other protective structures. The structure is simple. However, a disadvantage is that the current protective cover is usually made of a hard material, so the transition display region 2021 cannot be flattened from the curved-surface state. Therefore, the display panel of the rollable display device only has one unrolled state, i.e., the first display region 201 is rolled out from the accommodating housing 101 along the horizontal direction and is flattened to form a side-viewed structure illustrated in FIG. 15 and a three-dimensional structure illustrated in FIG. 16. Compared to the display state of the first display region 201, the transition display region 2021, and the attaching display region 2022 being coplanar in the previous embodiment, a display area of the rollable display device provided by this embodiment in the unrolled state is smaller.

In several embodiments, the display panel is usually an organic light emitting diode (OLED) display panel. Of course, it can be other types of panels which can realize flexible display, and it is not limited by the present disclosure.

It should be noted that, the structures are only described in the embodiments of the rollable display device mentioned above. It can be understood that, in addition to the structures mentioned above, the display device of the embodiments of the present disclosure may further include any other necessary structures as needed, and specifically, are not limited herein.

In the embodiments mentioned above, the descriptions to the various embodiments are emphasized, and the part is not described in detailed in an embodiment, can refer to the detailed description of other embodiments mentioned above, and will not give unnecessary details herein.

During a specific implementation, the various units or structures mentioned above may be implemented as a separate entity, or may be implemented in any combination, as the same or several entities. For the specific implementation of the various units or structures mentioned above, can refer to the method embodiments mentioned above, and will not give unnecessary details herein.

The rollable display device provided by the embodiments of the present disclosure are described in detail. This article uses specific cases for describing the principles and the embodiments of the present disclosure, and the description of the embodiments mentioned above is only for helping to understand the method and the core idea of the present disclosure. Meanwhile, for those skilled in the art, will have various changes in specific embodiments and application scopes according to the idea of the present disclosure. In summary, the content of the specification should not be understood as limit to the present disclosure.

What is claimed is:

1. A rollable display device, comprising a housing and a display panel, wherein the housing comprises an accommodating housing, and the accommodating housing comprises an internal accommodating space and an opening communicated with the accommodating space;

the display panel at least comprises a first display region and a second display region and is switchable between a rolled-up state and an unrolled state, the second display region comprises a transition display region and an attaching display region, and the transition display region is connected between the first display region and the attaching display region;

when the display panel is in the rolled-up state, the first display region is rolled up in the accommodating space through the opening, and the second display region is located outside the accommodating housing and is configured to display, the transition display region is bent to form a curved surface to make the attaching display region abut the outer surface of the housing; and when the display panel is in the unrolled state, the first display region is rolled out of the accommodating housing through the opening, and the second display region is away from the outer surface of the housing and is configured to display together with the first display region.

2. The rollable display device as claimed in claim 1, wherein a magnetic attraction device is disposed on the outer surface of the housing, and the second display region is detachably abutted the outer surface of the housing by the magnetic attraction device.

3. The rollable display device as claimed in claim 1, wherein the housing further comprises a supporting housing, the supporting housing is connected to a side of the accommodating housing where the opening is defined, a supporting surface is formed on a side of the supporting housing away from the accommodating housing, and the attaching display region is abutted the supporting surface.

4. The rollable display device as claimed in claim 1, wherein the rollable display device further comprises a transparent cover plate, and the transparent cover plate is attached to at least part of the second display region.

5. The rollable display device as claimed in claim 4, wherein the transparent cover plate is a planar cover plate attached to the attaching display region.

6. The rollable display device as claimed in claim 5, wherein the housing further comprises a protective housing, the protective housing is connected to the accommodating housing on a side of the opening, the opening is located between the protective housing and the supporting housing, the planar cover plate is in contact with the protective housing and the supporting housing to make the transition display region be disposed in a space formed by the accommodating housing, the protective housing, and the planar cover plate when the display panel is in the rolled-up state.

7. The rollable display device as claimed in claim 5, wherein the unrolled state comprises a first unrolled state and a second unrolled state, when the display panel is in the first unrolled state, the first display region is rolled out from the accommodating housing along a horizontal direction and flattened; when the display panel is in the second unrolled state, the transition display region is flattened from a curved-surface state to make the first display region, the transition display region, and the attaching display region be coplanar.

8. The rollable display device as claimed in claim 4, wherein the transparent cover plate comprises a bending region and a planar region, the bending region is attached to the transition display region and the planar region is attached to the attaching display region.

9. The rollable display device as claimed in claim 8, wherein when the display panel is in the rolled-up state, the bending region of the transparent cover plate is abutted the accommodating housing at an upper edge of the opening.

10. The rollable display device as claimed in claim 1, wherein the display panel is an organic light emitting diode (OLED) display panel.

11. The rollable display device as claimed in claim 1, wherein the opening is a slit-type opening.

12. The rollable display device as claimed in claim 1, wherein a roller shaft is further disposed in the accommodating housing, the first display region is rolled up or unrolled by the roller shaft.

13. The rollable display device as claimed in claim 1, wherein a shape of the display device is a strip-shaped rectangle.

14. The rollable display device as claimed in claim 1, wherein anti-curl strips are disposed on two lateral sides of the display panel along a rolled-up direction.

15. A rollable display device, comprising a housing and a display panel, wherein the housing comprises an accommodating housing, and the accommodating housing comprises an internal accommodating space and an opening communicated with the accommodating space;

the display panel at least comprises a first display region and a second display region and is switchable between a rolled-up state and an unrolled state, the second display region comprises a transition display region and an attaching display region, and the transition display region is connected between the first display region and the attaching display region;

when the display panel is in the rolled-up state, the first display region is rolled up in the accommodating space through the opening, and the second display region is located outside the accommodating housing and is configured to display, and the transition display region is bent to form a curved surface to make the attaching display region abut the outer surface of the housing; and when the display panel is in the unrolled state, the first display region is rolled out of the accommodating housing through the opening, and the second display region is away from the outer surface of the housing and is configured to display together with the first display region;

wherein the rollable display device further comprises a hinge, and the hinge is disposed on a lateral surface of the transition display region facing away from a light-exiting direction.

16. A rollable display device, comprising a housing and a display panel, wherein the housing comprises an accommodating housing, and the accommodating housing comprises an internal accommodating space and an opening communicated with the accommodating space;

the display panel at least comprises a first display region and a second display region and is switchable between a rolled-up state and an unrolled state;

when the display panel is in the rolled-up state, the first display region is rolled up in the accommodating space through the opening, and the second display region is located outside the accommodating housing and is configured to display, and the second display region is at least partially abutted an outer surface of the housing; and when the display panel is in the unrolled state, the first display region is rolled out of the accommodating housing through the opening, and the second display region is away from the outer surface of the housing and is configured to display together with the first display region;

wherein the accommodating housing is cylindrical, and the second display region is abutted an outer lateral surface of the accommodating housing.

* * * * *